April 7, 1964     R. H. REX     3,127,637
METHOD OF AND APPARATUS FOR MAKING PLASTIC ARTICLES
Filed May 12, 1961
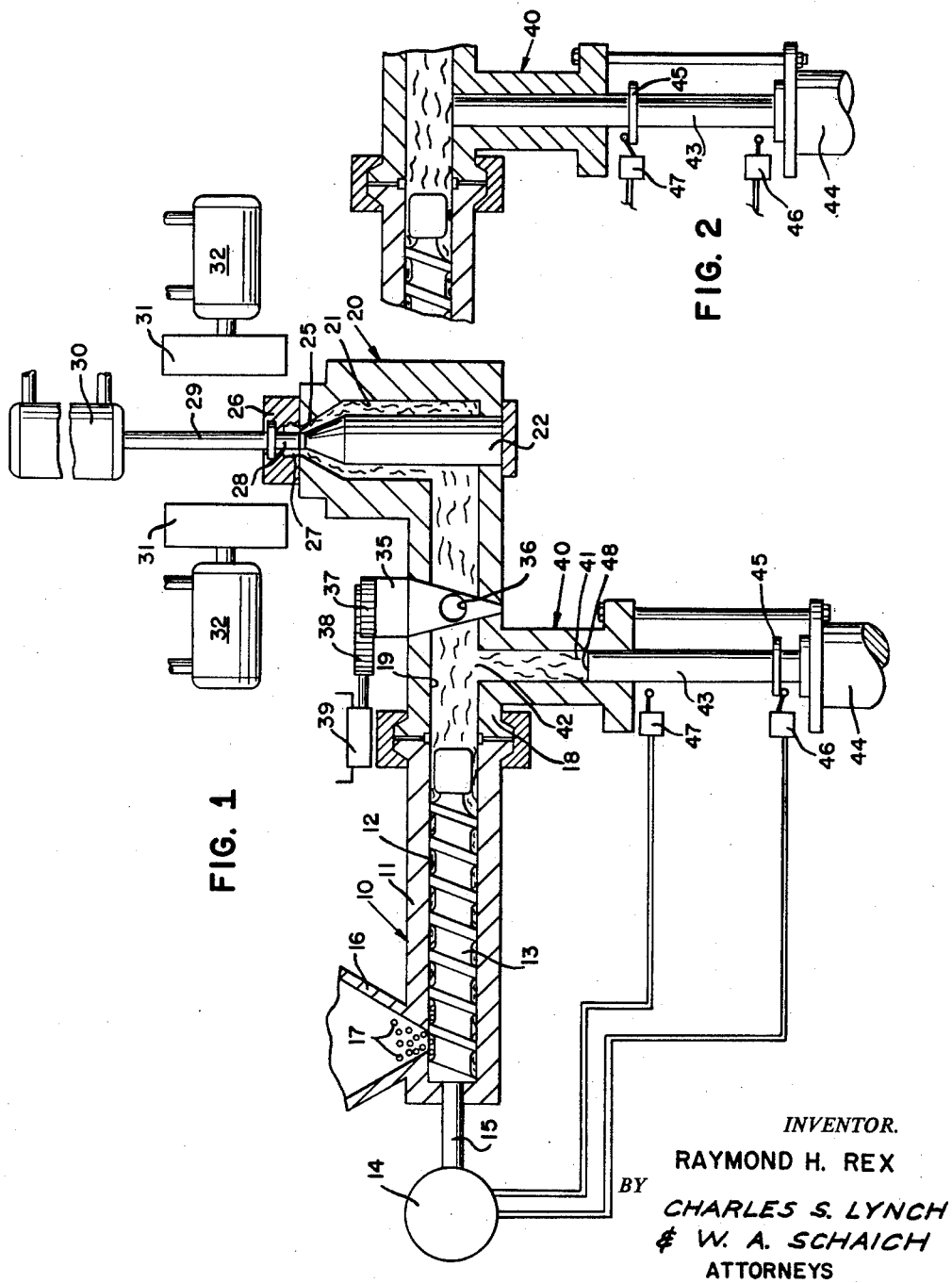
INVENTOR.
RAYMOND H. REX
BY
*CHARLES S. LYNCH*
*& W. A. SCHAICH*
ATTORNEYS

United States Patent Office 3,127,637
Patented Apr. 7, 1964

3,127,637
METHOD OF AND APPARATUS FOR MAKING PLASTIC ARTICLES
Raymond H. Rex, Toledo, Ohio, assignor to Owens-Illinois Glass Company, a corporation of Ohio
Filed May 12, 1961, Ser. No. 109,620
5 Claims. (Cl. 18—30)

The present invention relates to a method of and apparatus for making a plastic article and more particularly to a method of and apparatus for making such articles from thermoplastic material wherein the volumetric and pressure output of a plasticizer-extruder is supplemented by an additional piston while limiting the period of residence of the material in the apparatus after its plasticization.

In the manufacture of plastic articles from thermoplastic materials, it has been proposed that a substantially continuously operating plasticizer-extruder be utilized as a source of plasticized material, with intermittent dispensing of the plasticized material being accommodated by means of recirculating the plasticized material from the outlet of the extruder to a mid-point of the extruder. Such an apparatus and method is illustrated in the patent to O. B. Sherman et al., No. 2,871,516, assigned to the assignee of the present invention.

In the manufacture of articles from thermally stable thermoplastic materials, such as polyethylene, the recirculation of the plasticized material can be readily accomplished without undue thermal degradation of the material. However, in the formation of articles from other materials, such as polystyrene, nylon, vinyl polymers and copolymers, and "Delrin," such recirculation is not feasible. Thermal degradation of these materials may well occur, resulting in material decomposition and discoloration, because of the passage of the same increment of plasticized material through the system more than once or because of residence of the same increment in a "dead-spot" in the recirculation or accumulation areas.

The present invention now provides a new and improved apparatus and method for utilizing plasticized material in the manufacture of articles by either extrusion or injection molding, or by combined extrusion and injection molding techniques. The present apparatus and method are particularly well adapted to relatively thermally unstable materials, such as those above-enumerated, inasmuch as the material is not recirculated, but is accumulated for subsequent use and the material passes through a plasticizer-extruder only once, the total material residence time within the system being readily regulated to fall far short of the period necessary to initiate thermal degradation.

More specifically, the present invention contemplates the utilization of an accumulation chamber communicating freely with the plasticizer-extruder and communicating through an "off-on" valve with an orifice through which the plasticized material is dispensed. This accumulation chamber is provided with a purging element, preferably the piston of a fluid-pressure-actuated cylinder, the pressure exerted on the material by the purging element governing the output pressure of the material at the orifice and being less than the maximum output pressure of the plasticizer-extruder.

The amount of material expressed from the plasticizer-extruder within a given period of time is preferably in excess of that intermittently expressed from the orifice within the same period, this additional material being accumulated in the accumulation chamber and material alternatively being expressed through the orifice from both the plasticizer-extruder and the accumulation chamber or being expressed from the accumulator when the off-on valve is open. When the off-on valve is closed, the pressure within the plasticizer-extruder rises, because of the supplying of material to a closed conduit including the accumulation chamber. This pressure forces the accumulation chamber piston outwardly in the chamber to accommodate the accumulation of the plasticizer-extruder output ahead of the piston. When sufficient material has been accumulated in the accumulation chamber, the extruder is stopped, and subsequently material is displaced from the accumulation chamber until the accumulation chamber is purged completely, after which the plasticizer-extruder is started and the accumulation of additional material is again initiated.

It is, therefore, an important object of the present invention to provide an apparatus for and method of making plastic articles from plasticized material supplied by a plasticizer-extruder and accumulated in an accumulation zone effectively interposed between the plasticizer-extruder and an output orifice.

It is another important object of this invention to provide a method of making plastic articles from plasticized material at least partially supplied from an accumulated body of material, the period of residence of the plasticized material within the accumulation zone being limited to prevent thermal degradation of the material.

A further important object of this invention is the provision of an apparatus for making plastic articles including a plasticizer-extruder for supplying material to a dispensing orifice and an accumulation chamber receiving material from the plasticizer-extruder when such material is not being expressed through the orifice and means for generating a dispensing pressure within the accumulation zone determining the pressure at which plasticized material is issued from the orifice and preventing thermal degradation of plasticized material.

Other objects of this invention will appear in the following description and appended claims, reference being had to the accompanying drawings forming a part of this specification wherein like reference characters designate corresponding parts in the several views.

On the drawings:

FIGURE 1 is a schematic representation of an apparatus of the present invention capable of carrying out the method of this invention;

FIGURE 2 is a fragmentary schematic view similar to FIGURE 1 illustrating an operative position of the apparatus.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURES 1 and 2, reference numeral 10 refers generally to a plasticizer including a plasticizer barrel 11 enclosing a generally cylindrical interior space 12 within which is disposed a helically threaded plasticizer screw 13 driven by an electric or hydraulic motor 14 through a drive shaft 15.

The barrel chamber 12 is adapted to receive plasticized material from an upper hopper 16, the solid plastic material being in the form of pellets or the like 17 dropping into the barrel chamber 12 for travel therealong under heat externally supplied by electric resistance heaters (not shown) and by the pressure of the rotatably driven plasticizer screw 13.

Plasticized material from the barrel chamber 12 is supplied through a conduit 18 having an interior flow channel 19 to an orifice block 20. This orifice block 20 is provided with one or more generally vertically extending flow passages 21 therein concentric with upstanding mandrels 22 to define upper dispensing orifices 25. Vertically aligned with each of the orifices 25 is an injection or neck mold 26 having an interior mold cavity 27 defined between a bottom opening neck mold recess and a centrally located core pin 28. The neck molds 26 are vertically movable by means of the actuating rod 29 of an upper actuating cylinder 30.

As is well known in the art, this apparatus is well adapted for the manufacture of containers or the like in which the neck or finish portions are injection molded in the mold cavity 27 when the mold is positioned as illustrated in FIGURE 1 in direct close communication with the orifice 25. After filling of the mold space 27, the mold 26 is vertically moved upwardly by retraction of the actuating rod 29 of an upper cylinder 30 to extrude a tube through the orifice 25 integral with the material filling the mold space 27. This tube is subsequently enclosed within segmental blow molds 31, which are individually actuated by cylinders 32 to close upon the extruded tube, the tube being inflated to form the blow molded body of the container.

An apparatus utilizing substantially this same combination of steps to form articles by combined injection molding, extrusion and blow molding techniques is illustrated and claimed in the copending application of Richard C. Allen and Leon E. Elphee, Serial No. 797,276, filed in the United States Patent Office on March 4, 1959, now Patent No. 3,008,192, and assigned to the assignee of the present invention.

The flow of plasticized material through the conduit 19 is under the control of a rotary valve 35 having a valve port 36 registrable with the conduit 19 to accommodate the flow of material from the extruder screw 13 to the orifice 25. In the illustrated embodiment of the invention of FIGURE 1, the valve is shown in its closed position, that is with the port 36 turned cross-wise of the conduit 19 to interrupt communication between the screw 13 and the orifice 25. The valve is provided at its upper end with a co-rotatable pinion 37 meshing with a reciprocatable rack 38 which is displaceable longitudinally by means of a hydraulic cylinder 39.

Communicating with the conduit 19 intermediate the valve 35 and the outlet end of the screw 13 is an accumulation chamber, indicated generally at 40, and including an interior cavity 41 having an upper end communicating, as at 42, with the conduit 19, and having its lower end closed by a material-displacing piston 43 movable vertically by means of a lower fluid pressure-actuated cylinder 44. Carried by the piston 43 externally of the cavity or chamber 41 is a switch-actuating collar 45 contactable with a lower limit switch 46 when the piston 43 is in its fully retracted position (illustrated in FIGURE 1) and contactable with an upper limit switch 47 when the piston is in its upward position (as illustrated in FIGURE 2).

Obviously, vertical displacement of the piston 43, in response to actuation of the cylinder 44 varies the volume of the cavity or chamber 41 from its maximum capacity of FIGURE 1 to its minimum capacity of FIGURE 2. Preferably, the end face 48 of the piston 43 is contoured to mate with the cylindrical surface of the conduit 19, so as to accommodate complete purging of the cavity 41 when the piston is in its position of FIGURE 2.

The limit switches 46 and 47 operate a start-stop arrangement for the motor 14. Since the motor 14 may be either electrically energized or hydraulically energized, the limit switches 46 and 47 may actuate either electrical contacts or switches or hydraulic valves, respectively. In either event, the limit switch 46 is effective to stop the motor 14 and terminate driving of the screw 13, while the limit switch 47 is effective to start operation of the motor 14 and initiate rotation of the screw 11.

*Operation*

As previously explained, rotation of the helical screw 13, in combination with the externally applied heat, will plasticize solid plastic material 17 supplied to the screw, so that plasticized material is supplied to the conduit 19. If the valve 35 is in its closed position of FIGURE 1, such plasticized material will exert a pressure upon the upper terminal face 48 of the piston 43.

The cylinder 44 is preferably of the single acting type wherein fluid pressure is supplied to the lower end thereof to continuously urge the piston 43 upwardly within the cavity 41. The pressure thus exerted by the piston face 48 is preferably less than the output pressure of the plasticizer-extruder screw 13, i.e. the pressure of plasticized material in the closed conduit 19. Consequently, the continued supplying of plasticized material to the conduit 19 will force the piston 43 downwardly within the cavity 41 until a body of plasticized material has been accumulated therein, such movement of the piston continuing until the collar 45 of the piston contacts the limit switch 46. Upon contact of the collar 45 with the limit switch 46, the motor 14 driving the screw 13 will be stopped.

At this time, no more plasticized material is supplied to the conduit 19 by the screw 13, but the reservoir of previously accumulated plasticized material is available from the accumulator chamber 41. Upon opening of the valve 35, access is provided to the orifice 25 and material will be expressed from the reservoir or accumulation cavity 41 under the pressure of the piston 43 which continues to be urged upwardly by the cylinder 44.

Such material will flow through the conduit 19, through the flow space provided between the extrusion chamber 21 and the mandrel 22, and through the orifice 25 into the injection mold cavity 27. After the injection mold cavity has been filled, material will be retained therein under the pressure of the piston 43 until such time as the cylinder 30 is actuated to elevate the mold from its position directly overlying the orifice. At this time, a tube will be extruded through the open orifice 25, also under the pressure of the piston 43, this tube being integral with material previously injected into the cavity 27. Following elevation of the injection mold and extrusion of the tube, the blow molds 13 are closed and the tube is blown to its final configuration. Prior to closure of the blow molds, the valve 35 is actuated to close the conduit 19, so that no more material will be dispensed through the orifice 25.

If the amount of material consumed in filling the neck mold cavity 27 and in forming the tube is less than the capacity of the cavity 41, the screw 13 will not be re-started inasmuch as the accumulation chamber piston 43 will not attain its position of FIGURE 2 at which the re-start limit switch 47 is closed. However, if at any time the consumption of material for forming the injection molded and tube portions of the article is greater than the capacity of the cavity 41, the limit switch 47 will be closed and the screw 13 will be re-started to supply fresh plasticized material to the conduit 19 for eventual expression through the orifice 25.

If the limit switch 47 is actuated during the expression of material through the orifice 25, then material will subsequently be supplied through the orifice 25 from both the screw 13 and the cavity 41, depending upon the ratio of the output of the screw to the demand at the orifice. On the other hand, if the valve 35 were closed during rotation of the screw, such material issuing from the screw will merely be supplied to the accumulation cavity 41. In the event that there is a demand for material at the orifice 25 prior to complete refilling of the accumulation cavity 41, material will again be supplied to the orifice from both the screw 13 and the cavity 41.

It will readily be comprehended that the present invention provides an accumulation chamber 41 which provides material for subsequent supply to the orifice 25 even during those periods at which the screw 13 is not being rotated by the motor 14. Further, the accumulator cavity 41 provides the means for controlling operation of the extruder screw 13, namely through the limit switches 46 and 47, while concurrently preventing the accumulation of material in recirculation passages or "dead spots" wherein the material will be continuously heated over an extended period of time, thus inducing thermal degradation in the material. Complete purging of the accumulation chamber 41 prior to initiation of screw rotation is necessary due to the location of the screw-starting limit switch 47, thereby again facilitating operation of the apparatus without thermal degradation of material flowing therethrough.

Having thus described my invention, I claim:

1. In an apparatus for intermittently issuing plasticized material through an orifice, a plasticizer-extruder screw, means for rotatably driving said screw to supply plasticized material to a screw-orifice conduit, a valve in said conduit for alternately establishing and interrupting screw-to-orifice communication, means defining an accumulation chamber in constant communication with said screw and receiving plasticized material from said screw when screw-to-orifice communication is interrupted, a material purging piston for displacing material from said accumulation chamber through said conduit, constant pressure means for displacing said piston in one direction and opposing movement of the piston in its other direction, means responsive to substantially complete displacement of said piston in said one direction by said pressure means for starting rotation of the screw, and means responsive to displacement of said piston in said other direction by pressured material from the screw for stopping rotation of said screw.

2. In an apparatus for intermittently issuing plasticized material through an orifice and including a plasticizer-extruder screw rotated by a motor to issue material at a material output pressure, the improvements of means defining an accumulation chamber for receiving plasticized material from said screw when material from the screw is not being issued from the orifice, a linearly displaceable material purging element for displacing material from said accumulation chamber, means constantly urging said element in a direction to displace material from said chamber at a constant pressure less than the material output pressure of said screw, means responsive to positioning of said element upon filling of said chamber for stopping the screw motor and means responsive to positioning of said element upon emptying of said chamber for starting the screw motor.

3. In a method of making a plastic article from material expressed through an orifice expressed from a screw-type plasticizer-extruder, communication between said plasticizer-extruder and the orifice being controlled by a valve, the steps of accumulating a body of material during those periods when communication is interrupted between the plasticizer-extruder and the orifice, halting rotation of the screw-type plasticizer-extruder when said body of material has attained a predetermined volume, dispensing material from said accumulated body only through said orifice, initiating rotation of the screw-type plasticizer-extruder when the body of accumulated material is exhausted, and dispensing material from both said plasticizer and said body during the re-accumulation of the predetermined volume of material.

4. In a method of making a plastic article from material expressed through an orifice, the material being plasticized in a screw-type plasticizer-extruder, the steps of isolating the plasticizer-extruder from the orifice, accumulating a body of material intermediate successive issues of material through the orifice, halting rotation of the screw-type plasticizer-extruder when said body of material has been accumulated, establishing communication between said plasticizer-extruder and said orifice, dispensing material from the accumulated body through the orifice, and initiating rotation of the screw-type plasticizer-extruder when the body of accumulated material is exhausted to (1) express material through the orifice directly from said plasticizer-extruder so long as the plasticizer-extruder is in communication with the orifice and (2) thereafter to accumulate a second body of material.

5. In a method of making a plastic article by the intermittent expression through an orifice of plasticized material from the rotatable screw of a plasticizer-extruder, the steps of isolating the orifice from the screw, subjecting material supplied by the screw to a constantly applied pressure less than the output pressure of the screw, accumulating at said constantly applied pressure a predetermined volume of material intermediate said screw and said orifice, halting the screw when said volume of material has been accumulated, subjecting the material constituting said accumulated body to said constantly applied pressure to express material through the orifice when said screw is halted, starting the screw to express material subjected to the output pressure of the screw through the orifice when the body of accumulated material is exhausted, and continuing to rotate the screw after again isolating the orifice from the screw to again accumulate said predetermined volume at said constantly applied pressure.

References Cited in the file of this patent

UNITED STATES PATENTS

| | | |
|---|---|---|
| 2,831,214 | Eyles et al. | Apr. 22, 1958 |
| 2,881,477 | Triulzi | Apr. 14, 1959 |
| 2,890,491 | Hendry | June 16, 1959 |

FOREIGN PATENTS

| | | |
|---|---|---|
| 1,224,930 | France | June 28, 1960 |